Patented July 7, 1953

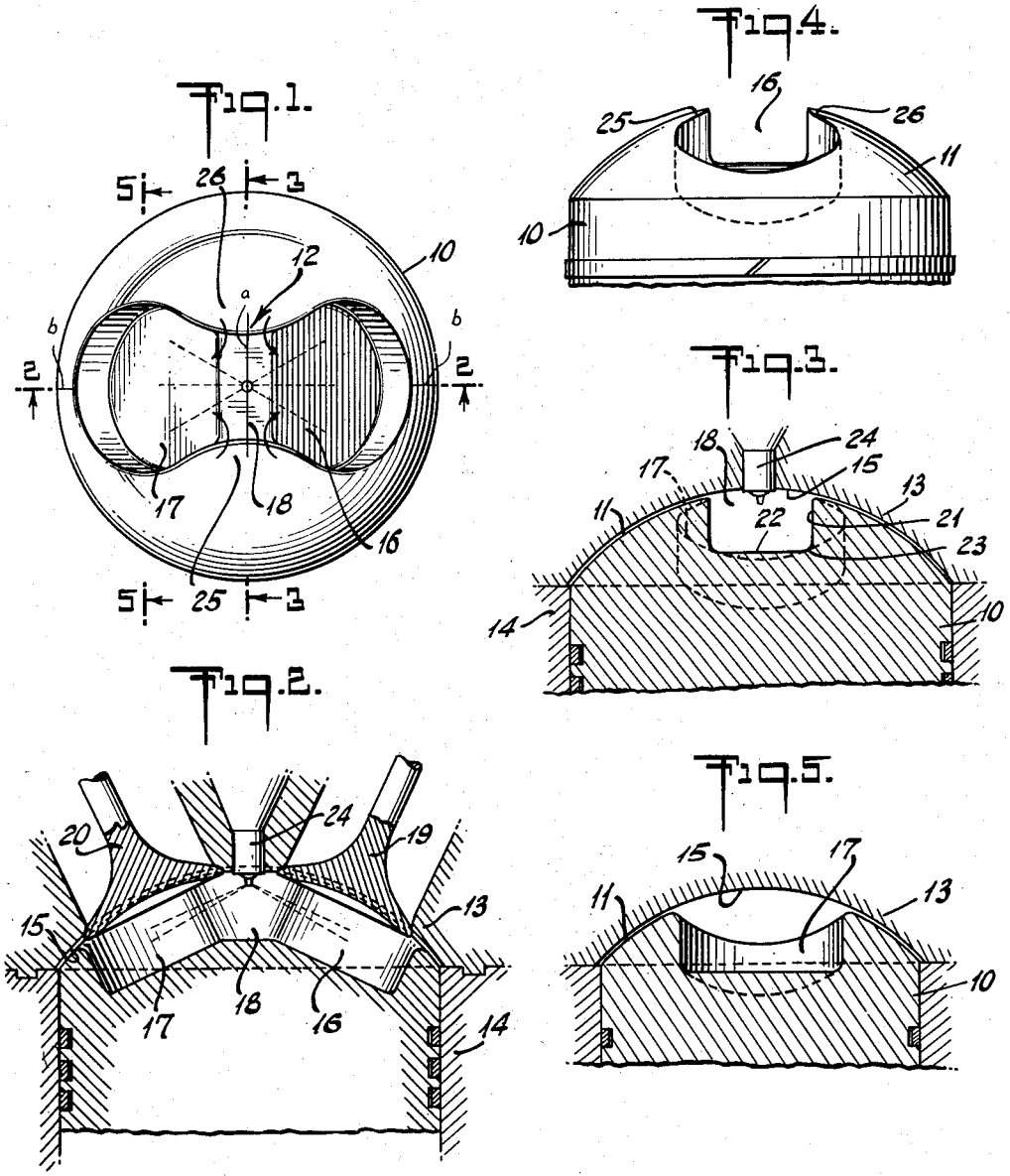

2,644,433

UNITED STATES PATENT OFFICE 2,644,433

COMBUSTION CHAMBER FOR INTERNAL-COMBUSTION ENGINES

Karl V. Anderson, Schenectady, N. Y., assignor to American Locomotive Company, New York, N. Y., a corporation of New York Application October 2, 1951, Serial No. 249,293

7 Claims. (Cl. 123—32)

This invention relates to a combustion chamber for an internal combustion engine of the compression-ignition type and the main object is to provide such a combustion chamber which will effect improved combustion and better scavenging performance.

Another object is to provide such a chamber formed by and between the piston and cylinder head, each of which is of novel design, so that improved combustion and better scavenging performance are effected.

Still another object is to provide a combustion chamber between the piston and cylinder head of an internal combustion engine of the compression-ignition type, such chamber having in plan two substantially cylindrical and diametrically opposed cavities connected by a channel, the cavities being adapted to permit the clearance of poppet valves therein and the channel being adapted for the location of a fuel injector tip therein.

Still another object is to provide such a chamber between a piston having a dome-shaped crown and a cylinder head having a spherical recess in its bottom face, the curvature of such recess being concentric with the curvature of the piston dome and the greater portion of the chamber lying in the piston crown.

Still another object is to provide such a combustion chamber having twin diametrically opposed cavities in the crown of a dome-shaped piston, such cavities being connected by a channel and being sloped downwardly and away from a plane normal to the piston axis and tangent to the piston dome, each cavity furthermore lying opposite an angularly disposed poppet valve adapted to open thereinto.

Still another object is to provide such a chamber between the piston, cylinder wall, and cylinder head of an internal combustion engine, the greater portion of the chamber being formed in the piston crown and comprising twin diametrically opposed cavities connected by a channel, the surface area of the piston crown outside the cavities being so shaped that the portions adjacent the channel will cause a powerful squish of combustion-supporting air into the channel and cavities as the piston closely approaches the cylinder head on its compression and scavenging strokes, such squishes being equally distributed into the cavities to improve combustion and scavenging.

Another object is to provide a combination of a cylinder, cylinder head, and piston to define a combustion chamber of novel design and to produce in operation a squish of combustion-supporting air into the chamber to effect a mixture of such air and incoming fuel which will bring about improved combustion.

Still another object is to provide such a combination to define a novel combustion chamber, such chamber lying for the most part in the piston and comprising twin cavities disposed on opposite sides of the piston axis and connected by a channel into which the fuel injector projects, the areas of the piston crown outside the chamber forming lobes which in conjunction with the cylinder head effect a powerful squish of combustion-supporting air into the chamber.

Other and further objects of the invention will appear from the following description, the accompanying drawings and the appended claims.

In the drawings:

Fig. 1 is a plan view of the piston as seen from above showing the fuel injector tip but omitting the cylinder walls for simplification;

Fig. 2 is an elevational section taken on the line 2—2 of Fig. 1 and partially showing the cylinder wall, cylinder head, valves and the injector;

Fig. 3 is an elevational section on the line 3—3 of Fig. 1 showing parts of the cylinder wall and head;

Fig. 4 is an elevational view showing the piston dome and one cavity; and

Fig. 5 is an elevational section taken on line 5—5 of Fig. 1 showing parts of the cylinder wall and head.

Referring to the drawings, I have, for simplification of illustration, shown my invention applied to a single cylinder of an internal combustion engine of the compression-ignition type, although in practical application, it will usually be applied to a multi-cylinder engine. I have shown in the illustrative embodiment a piston 10 with a dome shape crown 11 having a recess generally indicated at 12, which forms with cylinder head 13 and cylinder wall 14 a combustion chamber of novel design. Cylinder head 13 is shown with a spherical recess 15 curved concentrically with the curvature of the piston crown. I wish to emphasize at this point, however, that the chamber of my invention may be formed between pistons and cylinder heads of other construction, as for example, a piston with a flat crown and a cylinder head with a flat bottom face.

Viewed from above, the combustion chamber of my invention has a general shape of a figure 8 consisting of twin lobes connected by a broad waist. Otherwise described, it consists in plan of twin diametrically opposed cavities 16 and 17 joined by a contoured channel 18. In elevational section (see Fig. 2) it can be seen that the twin cavities are arranged on opposite sides of the axis of the piston and extend downwardly from the axis. Such an arrangement of the cavities allows for the reception of angularly arranged inlet and exhaust poppet valves 19 and 20. Channel 18 connecting cavities 16 and 17 is arranged across the dome, and as can be seen in Fig. 3, has vertical side walls 21 and a horizontal floor 22 connected by radii 23 of gentle contour. Fuel injector 24 is disposed centrally of the cylinder head so that its tip extends into channel 18.

Referring again to Fig. 1, I wish to call particular attention to the defined areas in the piston crown outside the chamber. Adjacent the connecting channel 18, the piston crown forms two rounded lobes 25 and 26 which are opposite each other and extend inwardly toward the center of the crown. These lobes merge into the circular walls of the adjacent chamber cavities 16 and 17.

The recess 15 in the cylinder head is located directly above the piston and the stroke of the piston is so determined that at top dead center it almost contacts the cylinder head. As the piston nears top dead center, the column of combustion supporting air lying above its crown outside the chamber area is highly compressed and a squish effect is thereby produced which causes the column of air to rush radially inwardly toward the axis of the piston. Air squish is well known in the art, but the novel design of my combustion chamber with the defined areas in the piston crown effects a squish possessing new characteristics. From an inspection of Fig. 1, it is obvious that the squish air has its highest velocity along the line $a$ connecting the midpoints of the edges of lobes 25 and 26. Air squish into the chamber from points along the receding edges of the lobes and from points along the edges of the cavities, as their distance from line $a$ increases, is of progressively diminishing velocity so that at the lines $b$, which are the points farthest removed from the center of the piston crown, it reaches its minimum.

Squish air produced at the midpoints of the lobes moves inwardly along line $a$, impinges upon the injector tip, and is turned downwardly into the channel 18 whence it is diverted in equal portions into the adjacent cavities. Squish air from either lobe, as it enters the channel adjacent line $a$, will encounter squish air from the opposite lobe and will be turned into the adjacent cavity as seen by the arrows in Fig. 1. Squish air produced beyond the lobes will be directed into the adjacent cavities toward the respective centers thereof.

One well known type of fuel injector supplies fuel to the combustion chamber in the shape of a conical spray which is emitted through a nozzle having circumferentially arranged orifices in its tip. This type of injector is modified for use with the combustion chamber here designed by the elimination of any spray orifices facing the channel walls. The fuel spray of such a modified injector will be in the form of two sectors of a cone, each directed downwardly and outwardly from the nozzle tip into the opposite cavities (see Figs. 1 and 2). The path of the squish air of highest velocity, as previously described, enters channel 18 and spreads equally into the cavities; and, as can be seen in Fig. 1, it follows the course of the fuel in the spray. Because of the higher than normal velocity of the squish air produced by the design of the invention, I am able to effect a better mixture of fuel and the combustion supporting air.

The design of my invention has the additional advantage of improved scavenging performance. The diameter of each of the valves is slightly less than the diameter of the cavities, thus providing a small clearance for the intake and exhaust of scavenging air. Since the wall of the adjacent cavity 16 conforms to the shape of the inlet valve 19 except at the channel, the course of the inrushing scavenging air will follow the wall throughout the zone in which the valve and wall conform in shape and thus thoroughly clean the cavity of the products of combustion. Such scavenging air will then rush through the relatively narrow entrance of the channel at a higher velocity than the velocity at the mouth of the inlet passage. As to the scavenging air which passes the inlet valve in the zone adjacent the channel entrance, this will rush downwardly across the channel into the cavity 17 opposite the exhaust valve except so far as it may be diverted by the scavenging air leaving cavity 16. The pressure and volume of the incoming scavenging air is such, however, that the combined flow of air from cavity 16 and from the zone between valve 19 and the channel mouth insures that cavity 17 will be given a thorough scavenging.

While there has been hereinbefore described an approved embodiment of this invention, it will be understood that many and various changes and modifications in form, arrangement of parts and details of construction thereof may be made without departing from the spirit of the invention, and that all such changes and modifications as fall within the scope of the appended claims are contemplated as a part of this invention.

What I claim is:

1. A power assembly for an internal combustion engine of the compression-ignition type comprising a cylinder, a valved cylinder head, a fuel injector extending through the center of the head, and a piston reciprocable in the cylinder, said piston having a combustion recess in its top surface comprising two diametrically opposed substantially circular cavities, and a contoured channel connecting the cavities, said cylinder, cylinder head, and recessed piston forming the combustion chamber of the engine.

2. A power assembly for an internal combustion engine of the compression-ignition type comprising a cylinder, a valved cylinder head, a fuel injector extending through the center of the head, and a piston, reciprocable in the cylinder, having a combustion recess in its top surface including two diametrically opposed substantially cylindrical spaced cavities, and a contoured channel connecting the cavities, the injector projecting into the channel and dispersing fuel into the cavities, said recessed piston, cylinder head, and cylinder forming the combustion chamber for the engine.

3. A power assembly for an internal combustion engine of the compression-ignition type comprising a cylinder, a cylinder head, overhead valves therein, a fuel injector extending through the center of the head, a piston reciprocable in the cylinder, and a recess in the piston crown including two diametrically opposed spaced cavities joined by a narrow contoured channel, the valves being adapted to open into the cavities and the injector projecting into the channel to inject fuel into the cavities, said cylinder, cylinder head, and recessed piston forming the combustion chamber of the engine.

4. A power assembly for an internal combustion engine of the compression-ignition type comprising a cylinder, a valved cylinder head having a spherical recess in its lower surface, a domed piston reciprocable in the cylinder into concentric relation with the spherical recess, the piston having a recess in its dome including two diametrically opposed substantially cylindrical spaced cavities and a narrow contoured channel connecting the cavitits, said cavities sloping downwardly and away from a plane normal to the piston axis and tangent to the piston dome and an injector extending through the center of the head into the channel to inject fuel into the cavities of the combustion chamber formed by the piston recess and the cylinder head when the piston is in its upper position.

5. In an internal combustion engine of the compression-ignition type, a cylinder head, a cylinder, a piston reciprocable therein, a combustion recess in the piston opening upwardly into the cylinder, said recess comprising in plan two diametrically opposed substantially cylindrical spaced cavities, a contoured restricted channel therebetween connecting said cavities, and an injection nozzle disposed in said head and projecting into said channel to inject fuel into the cavities whereby a substantial portion of the combustion supporting air between the cylinder head and piston when said piston is in its upper position is squished out into the cavities by way of the channel and cuts into the path of the injected fuel to provide improved combustion.

6. In a compression-ignition type of internal combustion engine of the class which has its fuel injector disposed in the cylinder head in alignment with the axis of the piston, a combustion chamber comprising a cylinder, a cylinder head, and a piston reciprocable in the cylinder, the piston having a recess formed in its crown and consisting of twin cavities connected by a channel, the surface area of the crown outside the recess including twin lobes disposed opposite each other adjacent the channel, said lobes being adapted on the compression stroke of the piston to coact with the cylinder head to create a squish of combustion supporting air moving radially inwardly at a high velocity to be distributed evenly into the twin cavities thus creating a mixture of fuel with combustion supporting air.

7. In a compression ignition type of internal combustion engine of the class which has its fuel injector disposed in the cylinder head in alignment with the axis of the piston, a combustion chamber comprising a cylinder, a cylinder head, and a piston reciprocable in the cylinder, the piston having a recess in its crown adapted to form with the cylinder and cylinder head a combustion chamber, said recess defining an area in the surface of the crown which includes twin lobes adjacent the crown center on opposite sides thereof adapted on the compression stroke of the piston to coact with the cylinder head to create a squish of combustion supporting air moving radially inwardly at a high velocity to be distributed evenly into the twin cavities thus creating a mixture of fuel with combustion supporting air.

KARL V. ANDERSON.

References Cited in the file of this patent

UNITED STATES PATENTS

| Number | Name | Date |
|---|---|---|
| 2,083,323 | Edwards | June 8, 1937 |
| 2,514,730 | Sonderegger | July 11, 1950 |

FOREIGN PATENTS

| Number | Country | Date |
|---|---|---|
| 567,631 | Great Britain | Feb. 23, 1945 |